United States Patent
Baird et al.

(10) Patent No.: US 12,346,302 B1
(45) Date of Patent: Jul. 1, 2025

(54) APPARATUS AND METHOD FOR UPDATING A USER DATA STRUCTURE

(71) Applicant: JASE MEDICAL L.L.C., Salt Lake City, UT (US)

(72) Inventors: John Knapp Baird, Salt Lake City, UT (US); Jonathan Hanks Baird, Alpine, UT (US); Shawn Rowland, Waialua, HI (US); Erik Rowland, Heber City, UT (US)

(73) Assignee: JASE MEDICAL L.L.C., Salt Lake City, UT (US)

( * ) Notice: Subject to any disclaimer, the term of this patent is extended or adjusted under 35 U.S.C. 154(b) by 0 days.

(21) Appl. No.: 18/991,024

(22) Filed: Dec. 20, 2024

(51) Int. Cl.
*G06F 16/23* (2019.01)
*G06F 3/0484* (2022.01)
*G06F 21/31* (2013.01)

(52) U.S. Cl.
CPC ............ *G06F 16/23* (2019.01); *G06F 3/0484* (2013.01); *G06F 21/31* (2013.01)

(58) Field of Classification Search
CPC .. G06F 16/23; G06F 16/2358; G06F 16/2379; G06F 16/2457; G06F 16/2477; G06F 3/0484; G06F 21/31
See application file for complete search history.

(56) References Cited

U.S. PATENT DOCUMENTS

| | | | |
|---|---|---|---|
| 10,496,793 B1 | 12/2019 | Lawrence et al. | |
| 2013/0246559 A1* | 9/2013 | Tisdale | G06F 16/9535 709/217 |
| 2019/0102679 A1* | 4/2019 | Roberts | G06Q 30/0631 |
| 2021/0082557 A1 | 3/2021 | Muhammad et al. | |
| 2022/0180125 A1* | 6/2022 | Shen | G06V 10/454 |
| 2024/0065550 A1* | 2/2024 | Connor | A61M 60/546 |

FOREIGN PATENT DOCUMENTS

| CN | 114171153 A | 3/2022 |
|---|---|---|
| IN | 202341067785 A | 11/2023 |
| KR | 20240014280 A | 2/2024 |

OTHER PUBLICATIONS

Welkin; How to Integrate E-Prescribing Treatment Into Your Care Management System; Dec. 6, 2023 | Blogs, Care Management.

* cited by examiner

*Primary Examiner* — James E Richardson
(74) *Attorney, Agent, or Firm* — Caldwell Intellectual Property Law

(57) ABSTRACT

An apparatus and method for updating a user data structure are disclosed. The apparatus includes a memory communicatively connected to at least a processor, wherein the memory contains instructions configuring the at least a processor to receive first user data associated with a plurality of first users, identify a plurality of first user parameters from the first user data, receive second user data associated with at least a second user, identify at least a second user parameter from the second user data, determine a field datum associated with the plurality of first users as a function of a temporal datum of the plurality of first user parameters and the at least a second user parameter, access a first user data structure and update the first user data structure as a function of the field datum.

20 Claims, 8 Drawing Sheets

APPARATUS AND METHOD FOR UPDATING A USER DATA STRUCTURE

FIELD OF THE INVENTION

The present invention generally relates to the field of data processing. In particular, the present invention is directed to an apparatus and method for updating a user data structure.

BACKGROUND

Data structures play a foundational role in enabling the efficient storage, retrieval, and manipulation of information across a variety of computing systems. Traditional data structures are often limited in their ability to dynamically adapt to changes in data patterns or user requirements. These limitations can lead to inefficiencies in data management, increased processing overhead, and a lack of scalability. There is therefore a need for an improved data structure.

SUMMARY OF THE DISCLOSURE

In an aspect, an apparatus for updating a user data structure is disclosed. The apparatus includes at least a processor and a memory communicatively connected to the at least a processor, wherein the memory contains instructions configuring the at least a processor to receive first user data associated with a plurality of first users, identify a plurality of first user parameters from the first user data, wherein identifying the plurality of first user parameters includes determining a temporal datum of the plurality of first user parameters as a function of a time gap between sequential time markers of time markers of the first user data, receive second user data associated with at least a second user, identify at least a second user parameter from the second user data, wherein identifying the at least a second user parameter includes generating parameter training data, wherein the parameter training data includes exemplary second user data correlated to exemplary second user parameters, training a parameter machine-learning model using the parameter training data and determining the at least a second user parameter using the trained parameter machine-learning model, determine a field datum associated with the plurality of first users as a function of the temporal datum of the plurality of first user parameters and the at least a second user parameter, access a first user data structure, wherein the first user data structure includes a plurality of data fields corresponds to a plurality of selected first users and update the first user data structure as a function of the field datum, wherein updating the first user data structure includes updating the plurality of data fields to include the first user data associated with a first user of the plurality of first users related to the field datum and transmitting a notification as a function of the plurality of updated data fields.

In another aspect, a method for updating a user data structure is disclosed. The method includes receiving, using at least a processor, first user data associated with a plurality of first users, identifying, using the at least a processor, a plurality of first user parameters from the first user data, wherein identifying the plurality of first user parameters includes determining a temporal datum of the plurality of first user parameters as a function of a time gap between sequential time markers of time markers of the first user data, receiving, using the at least a processor, second user data associated with at least a second user, identifying, using the at least a processor, at least a second user parameter from the second user data, wherein identifying the at least a second user parameter includes generating parameter training data, wherein the parameter training data includes exemplary second user data correlated to exemplary second user parameters, training a parameter machine-learning model using the parameter training data and determining the at least a second user parameter using the trained parameter machine-learning model, determining, using the at least a processor, a field datum associated with the plurality of first users as a function of the temporal datum of the plurality of first user parameters and the at least a second user parameter, accessing, using the at least a processor, a first user data structure, wherein the first user data structure includes a plurality of data fields corresponds to a plurality of selected first users and updating, using the at least a processor, the first user data structure as a function of the field datum, wherein updating the first user data structure includes updating the plurality of data fields to include the first user data associated with a first user of the plurality of first users related to the field datum and transmitting a notification as a function of the plurality of updated data fields.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DETAILED DESCRIPTION

At a high level, aspects of the present disclosure are directed to apparatuses and methods for updating a user data structure are disclosed. The apparatus includes at least a processor and a memory communicatively connected to the at least a processor, wherein the memory contains instructions configuring the at least a processor to receive first user data associated with a plurality of first users, identify a plurality of first user parameters from the first user data, wherein identifying the at least a second user parameter includes determining a temporal datum of the plurality of first user parameters as a function of a time gap between sequential time markers of time markers of the first user data, receive second user data associated with at least a second user, identify at least a second user parameter from the second user data, wherein identifying the plurality of first user parameters includes generating parameter training data, wherein the parameter training data includes exemplary second user data correlated to exemplary second user parameters, training a parameter machine-learning model using the parameter training data and determining the at least a second user parameter using the trained parameter machine-learning model, determine a field datum associated with the plurality of first user as a function of the temporal datum of the plurality of first users parameters and the at least a second user parameter, access a first user data structure, wherein the first user data structure includes a plurality of data fields corresponds to a plurality of selected first users and update the first user data structure as a function of the field datum, wherein updating the first user data structure includes updating the plurality of data fields to include the first user data associated with a first user of the plurality of first users related to the field datum and transmitting a notification as a function of the plurality of updated data fields. Exemplary embodiments illustrating aspects of the present disclosure are described below in the context of several specific examples.

Figure 1:
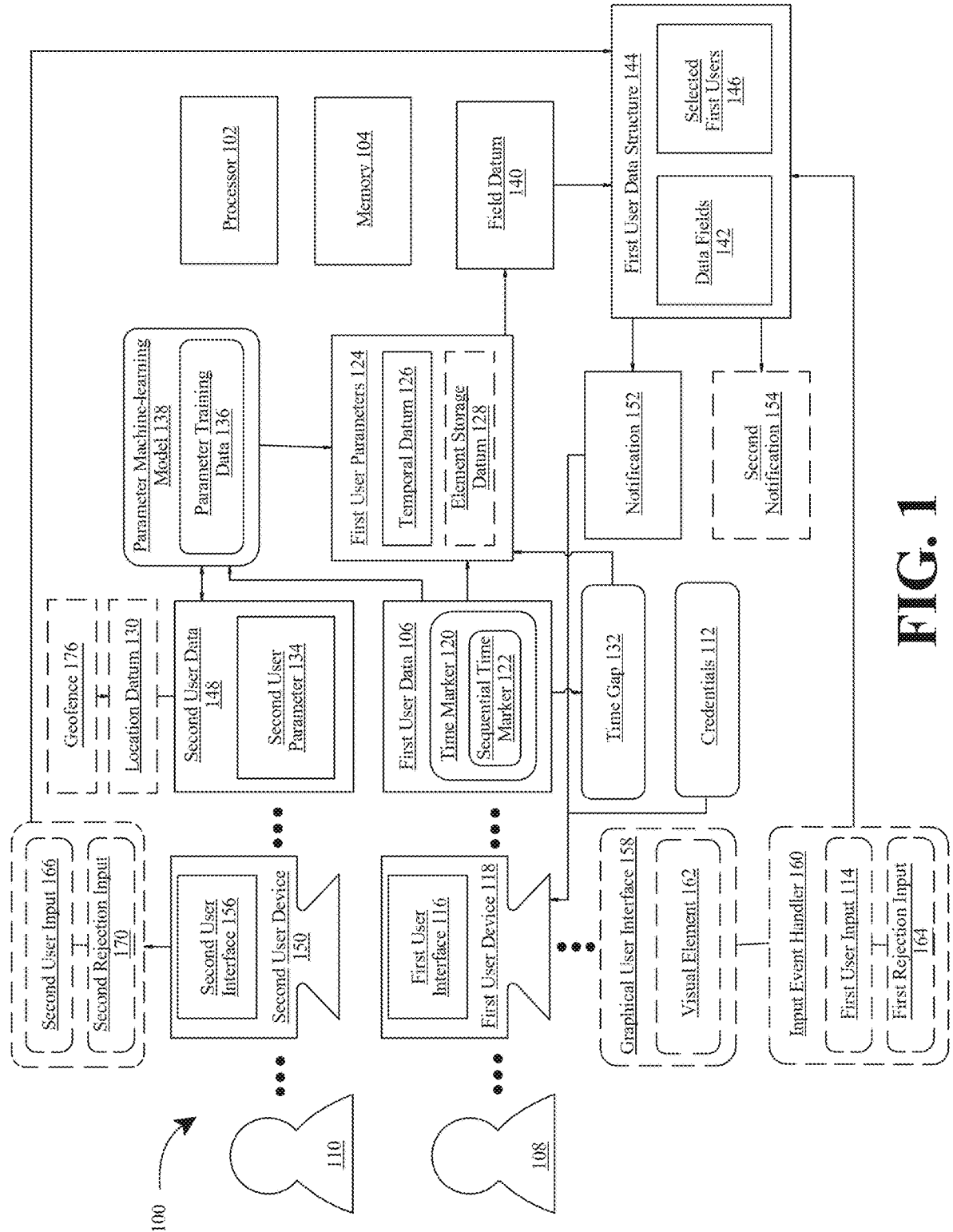
FIG. 1 illustrates a block diagram of an exemplary apparatus for updating a user data structure.

Referring now to FIG. 1, an exemplary embodiment of an apparatus 100 for updating a user data structure is illustrated. Apparatus 100 includes at least a processor 102. Processor 102 may include, without limitation, any processor described in this disclosure. Processor 102 may be included in a computing device. Processor 102 may include any computing device as described in this disclosure, including without limitation a microcontroller, microprocessor, digital signal processor (DSP) and/or system on a chip (SoC) as described in this disclosure. Processor 102 may include, be included in, and/or communicate with a mobile device such as a mobile telephone or smartphone. Processor 102 may include a single computing device operating independently, or may include two or more computing device operating in concert, in parallel, sequentially or the like; two or more computing devices may be included together in a single computing device or in two or more computing devices. Processor 102 may interface or communicate with one or more additional devices as described below in further detail via a network interface device. Network interface device may be utilized for connecting processor 102 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Processor 102 may include but is not limited to, for example, a computing device or cluster of computing devices in a first location and a second computing device or cluster of computing devices in a second location. Processor 102 may include one or more computing devices dedicated to data storage, security, distribution of traffic for load balancing, and the like. Processor 102 may distribute one or more computing tasks as described below across a plurality of computing devices of computing device, which may operate in parallel, in series, redundantly, or in any other manner used for distribution of tasks or memory between computing devices. Processor 102 may be implemented, as a non-limiting example, using a "shared nothing" architecture.

With continued reference to FIG. 1, processor 102 may be designed and/or configured to perform any method, method step, or sequence of method steps in any embodiment described in this disclosure, in any order and with any degree of repetition. For instance, processor 102 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 102 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, apparatus 100 includes a memory 104 communicatively connected to processor 102. For the purposes of this disclosure, "communicatively connected" means connected by way of a connection, attachment or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, memory 104 contains instructions configuring processor 102 to receive first user data 106 associated with at least a first user 108. For the purposes of this disclosure, "first user data" is data related to a first user. For the purposes of this disclosure, a "first user" is an individual, entity or organization that prepare, dispense, or manage medications. In a non-limiting example, first user 108 may provide diagnosis, treatment, medications, and/or management of medical conditions for second user 110. As a non-limiting example, first user 108 may include pharmacists, pharmacy, and other licensed professionals. In some embodiments, first user data 106 may include first user's name, age, credentials 112, contact information, area of expertise, license or certification information, or the like. As another non-limiting example, first user data 106 may include location information such as the physical address or geographic coordinates, daily order fulfillment capacity, reflecting a number of prescriptions first user 108 can process each day, current inventory levels, and the like.

With continued reference to FIG. 1, in some embodiments, first user data 106 may include a first user input 114. For the purposes of this disclosure, a "first user input" is an input that is inputted into a processor by a first user. As a non-limiting example, first user input 114 may include confirming receipt of a prescription order, marking the order as processed, indicating that the order is ready for pickup, noting that the order has been delivered, and similar status updates.

With continued reference to FIG. 1, in some embodiments, first user input 114 may include any input from a first user interface 116 from a first user device 118. In a non-limiting example, first user input 114 may be entered when a first user 108 selects or clicks specific options on first user interface 116 to indicate various stages in a prescription process. For the purposes of this disclosure, a "first user interface" is a user interface that is manipulated by a first user. For the purposes of this disclosure, a "user interface" is a means by which a user and a computer system interact; for example through the use of input devices and software. A user interface may include a graphical user interface (GUI), command line interface (CLI), menu-driven user interface, touch user interface, voice user interface (VUI), form-based user interface, any combination thereof and the like. In some embodiments, user interface may operate on and/or be communicatively connected to a decentralized platform, metaverse, and/or a decentralized exchange platform associated with the user. For example, a user may interact with user interface in virtual reality. In some embodiments, a user may interact with the use interface using a computing device distinct from and communicatively connected to at least a processor 102. For example, a smart phone, smart, tablet, or laptop operated by a first user 108. In an embodiment, user interface may include a graphical user interface. A "graphical user interface," as used herein, is a graphical form of user interface that allows users to interact with electronic devices. In some embodiments, GUI may include icons, menus, other visual indicators or representations (graphics), audio indicators such as primary notation, and display information and related user controls. A menu may contain a list of choices and may allow users to select one from them. A menu bar may be displayed horizontally across the screen such as pull-down menu. When any option is clicked in this menu, then the pull-down menu may appear. A menu may include a context menu that appears only when the user performs a specific action. An example of this is pressing the right mouse button. When this is done, a menu may appear under the cursor. Files, programs, web pages and the like may be represented using a small picture in a graphical user interface. For example, links to decentralized platforms as described in this disclosure may be incorporated using icons. Using an icon may be a fast way to open documents, run programs etc. because clicking on them yields instant access.

With continued reference to FIG. 1, for the purposes of this disclosure, a "first user device" is any device a first user use to input data. As a non-limiting example, first user device 118 may include a laptop, desktop, tablet, mobile phone, smart phone, smart watch, kiosk, screen, smart headset, or things of the like. In some embodiments, first user device 118 may include an interface configured to receive inputs from first user 108. In some embodiments, first user 108 may manually input any data into apparatus 100 using first user device 118. In some embodiments, first user 108 may have a capability to process, store or transmit any information independently.

With continued reference to FIG. 1, first user data 106 may include a plurality of time markers 120. For the purposes of this disclosure, a "time marker" is a time indicator associated with first user data. In a non-limiting example, time marker 120 may include exact date and time at which first user data 106 or first user input 114 occurs, providing a reference point for determining a sequence of first user data 106 or first user input 114 (e.g., sequential time markers 122). As a non-limiting example, first time marker may include a date and time at which first user 108 input a first user input 114 indicating a confirmation of receipt of a prescription order and second time marker may include a date and time at which first user 108 input another first user input 114 indicating that the order is ready for pickup.

With continued reference to FIG. 1, in some embodiments, first user data 106 and/or first user input 114 may be transmitted and received in a form of data packets. For the purposes of this disclosure, a "data packet" is a discrete unit of data that contains both information being transferred, "payload," and a "header" with metadata necessary for routing, sequencing, and reassembly. In some embodiments, header may include details such as a source and destination addresses, error-checking information, sequence numbers, and, a packet timestamp. The packet timestamp disclosed in this disclosure may be consistent with time marker 120. Packet timestamp may serve as a time marker for each data packet (e.g., first user data 106), recording precise time at which first user data 106 and/or first user input 114 like sending, receiving, or forwarding occur. For the purposes of this disclosure, "packet timestamping" refers to tracking a data packet's journey through a network. As a non-limiting example, packet timestamping may track data packets as timestamps may be added by an "originating node" (sender), a "receiving node" (recipient), or any "intermediary nodes" (e.g., routers or switches) handling the data packets along their route. In some embodiments, by referencing packet timestamps (time marker 120), processor 102 may determine an order of first user data 106 and/or first user input 114 and may identify sequential time markers 122. For the purposes of this disclosure, "sequential time markers" is a series of timestamps that are recorded in a specific chronological order.

With continued reference to FIG. 1, in some embodiments, first user data 106 may include credentials 112. A "credential" as described in the entirety of this disclosure, is a datum representing an identity, attribute, code, and/or characteristic specific to a first user and/or user device. For example, and without limitation, credential 112 may include a username and password unique to first user 108 and/or first user device 118. The username and password may include any alpha-numeric character, letter case, and/or special character. As a further example and without limitation, credential 112 may include a digital certificate. In some embodiments, processor 102 may authenticate a first user 108 using an authentication module. Authentication module may include any suitable software and/or hardware as described in the entirety of this disclosure. Authentication module may include a login portal for first users 108 to submit credentials 112. Authentication module and/or at least a processor 102 may be configured to receive credentials 112 associated with first users 108 from a first user device 118, compare credentials 112 to an authorized credentials stored within an authentication database, and bypass authentication for first user device 118 based on the comparison of credential 112 from first user device 118 to the authorized credential stored within the database.

With continued reference to FIG. in a non-limiting embodiment, authentication module or processor 102 may manipulate any information of the entirety of this disclosure to be displayed to a first user 108 with varying authority or accessibility. Authentication module or processor 102 may incorporate priority classifiers used to classify low, average, and high classification of authorized first users 108. First users 108 with lower priority classifications detected by authentication module may allow a limited amount of information (limited accessibility) to be displayed to a first user device 118 for viewing by first users 108 with lower priority classification. In a non-limiting embodiment, authentication module may detect first users 108 with high priority classifications and transmit a robust information with full accessibility. Persons of ordinary skill in the art, after viewing the entirety of this disclosure, would appreciate the various amount of information allowed to be viewed for different levels of authority. In a non-limiting embodiment, authentication module may be used as a security measure for information. A person of ordinary skill in the art, after viewing the entirety of this disclosure, would appreciate the function of an authentication module in the context of secure data exchange.

With continued reference to FIG. 1, in some embodiments, first user data 106 may be derived from a web crawler. A "web crawler," as used herein, is a program that systematically browses the internet for the purpose of Web indexing. The web crawler may be seeded with platform URLs, wherein the crawler may then visit the next related URL, retrieve the content, index the content, and/or measures the relevance of the content to the topic of interest. In some embodiments, processor 102 may generate web crawler to scrape first user data 106 from first user's website. The web crawler may be seeded and/or trained with a reputable website to begin the search. Web crawler may be generated by processor 102. In some embodiments, web crawler may be trained with information received from user through a user interface. In some embodiments, web crawler may be configured to generate a web query. A web query may include search criteria received from user. For example, user may submit a plurality of websites for web crawler to search to first user data 106. Additionally, web crawler function may be configured to search for and/or detect one or more data patterns. A "data pattern" as used in this disclosure is any repeating forms of information. In some embodiments, web crawler may be configured to determine the relevancy of a data pattern. Relevancy may be determined by a relevancy score. A relevancy score may be automatically generated by processor 102, received from a machine learning model, and/or received from user. In some embodiments, a relevancy score may include a range of numerical values that may correspond to a relevancy strength of data received from a web crawler function. As a non-limiting example, a web crawler function may search the Internet for first user data 106 related to user.

With continued reference to FIG. 1, in some embodiments, processor 102 may receive first user data 106 from first user device 118. In some embodiments, processor 102 may receive first user data 106 from a data store. In some embodiments, apparatus 100 may include a data store. As used in this disclosure, "data store" is a data structure configured to store data associated with a first user. In one or more embodiments, data store may include inputted or calculated information and datum related to a first user 108. In some embodiments, a datum history may be stored in data store. As a non-limiting example, the datum history may include real-time and/or previous inputted data related to first user 108. As a non-limiting example, data store may include instructions from a user, who may be an expert user, a past user in embodiments disclosed herein, or the like, where the instructions may include examples of the data related to first user 108.

With continued reference to FIG. 1, in some embodiments, processor 102 may be communicatively connected with data store. For example, and without limitation, in some cases, data store may be local to processor 102. In another example, and without limitation, data store may be remote to processor 102 and communicative with processor 102 by way of one or more networks. The network may include, but is not limited to, a cloud network, a mesh network, and the like. By way of example, a "cloud-based" system can refer to a system which includes software and/or data which is stored, managed, and/or processed on a network of remote servers hosted in the "cloud," e.g., via the Internet, rather than on local severs or personal computers. A "mesh network" as used in this disclosure is a local network topology in which the infrastructure processor 102 connect directly, dynamically, and non-hierarchically to as many other computing devices as possible. A "network topology" as used in this disclosure is an arrangement of elements of a communication network. The network may use an immutable sequential listing to securely store data store. An "immutable sequential listing," as used in this disclosure, is a data structure that places data entries in a fixed sequential arrangement, such as a temporal sequence of entries and/or blocks thereof, where the sequential arrangement, once established, cannot be altered or reordered. An immutable sequential listing may be, include and/or implement an immutable ledger, where data entries that have been posted to the immutable sequential listing cannot be altered.

With continued reference to FIG. 1, in some embodiments, data store may be implemented, without limitation, as a relational database, a key-value retrieval database such as a NOSQL database, or any other format or structure for use as a database that a person skilled in the art would recognize as suitable upon review of the entirety of this disclosure. Database may alternatively or additionally be implemented using a distributed data storage protocol and/or data structure, such as a distributed hash table or the like. Database may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure.

With continued reference to FIG. 1, processor 102 may receive first user data 106 using an application programming interface (API). As used in the current disclosure, an "application programming interface" is a software interface for two or more computer programs to communicate with each other. An application programming interface may be a type of software interface, offering a service to other pieces of software. In contrast to a user interface, which connects a computer to a person, an application programming interface may connect computers or pieces of software to each other. An API may not be intended to be used directly by a person (first user) other than a computer programmer who is incorporating it into the software. An API may be made up of different parts which act as tools or services that are available to the programmer. A program or a programmer that uses one of these parts is said to call that portion of the API. The calls that make up the API are also known as subroutines, methods, requests, or endpoints. An API specification may define these calls, meaning that it explains how to use or implement them. One purpose of API may be to hide the internal details of how a system works, exposing only those parts a programmer will find useful and keeping them consistent even if the internal details later change. An API may be custom-built for a particular pair of systems, or it may be a shared standard allowing interoperability among many systems. The term API may be often used to refer to web APIs, which allow communication between computers that are joined by the internet. API may be configured to query for web applications in order to retrieve first user data 106 to another web application, data database, insurance provider database, creditor database, medical center patient portal, and the like. An API may be further configured to filter through web applications according to a filter criterion. In this disclosure, "filter criteria" are conditions the web applications must fulfill in order to qualify for API. Web applications may be filtered based on these filter criteria. Filter criteria may include, without limitation, location of the medical facility, and the like.

With continued reference to FIG. 1, memory 104 contains instruction configuring processor 102 to identify a plurality of first user parameters 124 from first user data 106. For the purposes of this disclosure, a "first user parameter" is a variable or factor within first user data that is associated with a concept, attribute, or operation related to a first user. As a non-limiting example, first user parameter 124 may include keywords related to a first user. As used in this disclosure, a "keyword" is an element of word or syntax used to identify and/or match elements to each other. For example, and without limitation, first user parameter 124 may include keywords related to daily order fulfillment capacity, reflecting a number of prescriptions first user 108 can process each day, and the like. First user parameter 124 includes a temporal datum 126. For the purposes of this disclosure, a "temporal datum" is a data element related to turnaround time to get prescription ready. For example, and without limitation, temporal datum 126 may include information related to time it takes for a pharmacy (first user 108) to prepare a prescription order from the moment it is received until it is ready for pickup or delivery. As another non-limiting example, first user parameter 124 may include an element storage datum 128, location datum 130, and the like.

For the purposes of this disclosure, an "element storage datum" is a data element related to an inventory level of a first user. For example, and without limitation, element storage datum 128 may include information related to a number of specific medications or supplies currently in stock at the pharmacy. For the purposes of this disclosure, a "location datum" is a data element related to an address of a user. For example, and without limitation, location datum 130 may include information related to a street address or geographic coordinates of a pharmacy's physical location. In some embodiments, processor 102 may retrieve first user parameter 124 from data store. In some embodiments, user may manually determine first user parameter 124 from first user data 106. In some embodiments, processor 102 may determine a temporal datum 126 as a function of time markers 120. As a non-limiting example, processor 102 may determine temporal datum 126 by calculating duration between sequential time markers in time markers 120. In some embodiments, processor 102 may receive temporal datum 126, element storage datum 128, location datum 130, and the like using API.

With continued reference to FIG. 1, in some embodiments, determining a plurality of first user parameters 124 includes determining a temporal datum 126 of the plurality of first user parameters 124 as a function of a time gap 132 between sequential time markers 122 of time markers 120 of first user data 106. For the purposes of this disclosure, a "sequential time marker" is to a data point that records the exact time at which an event occurs, with multiple timestamps arranged in a chronological order to represent a series of events. Sequential time markers 122 may be associated with actions, interactions, or changes within a system, allowing the temporal relationship between events to be tracked and analyzed. A "time gap" between sequential time markers is the duration or interval that elapses between two consecutive time markers in the sequence. In some embodiments, time gap 132 may be calculated by subtracting the earlier timestamp from the later one, resulting in a value that represents the passage of time between the two recorded events. For example, and without limitation, sequential time markers 122 may mark the time at which a prescription order is received, processed, and marked as ready for pickup. The time gap 132 between the sequential time markers 122 would indicate the duration taken for each stage of the process (temporal datum 126), such as the time taken to process the prescription after it is received.

With continued reference to FIG. 1, in some embodiments, processor 102 may use a language processing module to find a keyword (first user parameter 124 and/or second user parameter 134). The language processing module may be configured to extract, from first user data 106, one or more words. One or more words may include, without limitation, strings of one or more characters, including without limitation any sequence or sequences of letters, numbers, punctuation, diacritic marks, engineering symbols, chemical symbols and formulas, spaces, whitespace, and other symbols, including any symbols usable as textual data as described above. Textual data may be parsed into tokens, which may include a simple word (sequence of letters separated by whitespace) or more generally a sequence of characters as described previously. The term "token," as used herein, refers to any smaller, individual groupings of text from a larger source of text; tokens may be broken up by word, pair of words, sentence, or other delimitation. These tokens may in turn be parsed in various ways. Textual data may be parsed into words or sequences of words, which may be considered words as well. Textual data may be parsed into "n-grams", where all sequences of n consecutive characters are considered. Any or all possible sequences of tokens or words may be stored as "chains", for example for use as a Markov chain or Hidden Markov Model.

With continued reference to FIG. 1, language processing module may operate to produce a language processing model. Language processing model may include a program automatically generated by processor 102 and/or language processing module to produce associations between one or more words extracted from at least a document and detect associations, including without limitation mathematical associations, between such words. Associations between language elements, where language elements include for purposes herein extracted words, relationships of such categories to other such term may include, without limitation, mathematical associations, including without limitation statistical correlations between any language element and any other language element and/or language elements. Statistical correlations and/or mathematical associations may include probabilistic formulas or relationships indicating, for instance, a likelihood that a given extracted word indicates a given category of semantic meaning. As a further example, statistical correlations and/or mathematical associations may include probabilistic formulas or relationships indicating a positive and/or negative association between at least an extracted word and/or a given semantic meaning; positive or negative indication may include an indication that a given document is or is not indicating a category semantic meaning. Whether a phrase, sentence, word, or other textual element in a document or corpus of documents constitutes a positive or negative indicator may be determined, in an embodiment, by mathematical associations between detected words, comparisons to phrases and/or words indicating positive and/or negative indicators that are stored in memory at computing device, or the like.

With continued reference to FIG. 1, language processing module may generate the language processing model by any suitable method, including without limitation a natural language processing classification algorithm; language processing model may include a natural language process classification model that enumerates and/or derives statistical relationships between input terms and output terms. Algorithm to generate language processing model may include a stochastic gradient descent algorithm, which may include a method that iteratively optimizes an objective function, such as an objective function representing a statistical estimation of relationships between terms, including relationships between input terms and output terms, in the form of a sum of relationships to be estimated. In an alternative or additional approach, sequential tokens may be modeled as chains, serving as the observations in a Hidden Markov Model (HMM). HMMs, as used herein, are statistical models with inference algorithms that that may be applied to the models. In such models, a hidden state to be estimated may include an association between an extracted words, phrases, and/or other semantic units. There may be a finite number of categories to which an extracted word may pertain; an HMM inference algorithm, such as the forward-backward algorithm or the Viterbi algorithm, may be used to estimate the most likely discrete state given a word or sequence of words. Language processing module may combine two or more approaches. For instance, and without limitation, machine-learning program may use a combination of Naive-Bayes (NB), Stochastic Gradient Descent (SGD), and parameter grid-searching classification techniques; the result may include a classification algorithm that returns ranked associations.

With continued reference to FIG. 1, generating language processing model may include generating a vector space, which may be a collection of vectors, defined as a set of mathematical objects that can be added together under an operation of addition following properties of associativity, commutativity, existence of an identity element, and existence of an inverse element for each vector, and can be multiplied by scalar values under an operation of scalar multiplication compatible with field multiplication, and that has an identity element is distributive with respect to vector addition, and is distributive with respect to field addition. Each vector in an n-dimensional vector space may be represented by an n-tuple of numerical values. Each unique extracted word and/or language element as described above may be represented by a vector of the vector space. In an embodiment, each unique extracted and/or other language element may be represented by a dimension of vector space; as a non-limiting example, each element of a vector may include a number representing an enumeration of co-occurrences of the word and/or language element represented by the vector with another word and/or language element. Vectors may be normalized, scaled according to relative frequencies of appearance and/or file sizes. In an embodiment associating language elements to one another as described above may include computing a degree of vector similarity between a vector representing each language element and a vector representing another language element; vector similarity may be measured according to any norm for proximity and/or similarity of two vectors, including without limitation cosine similarity, which measures the similarity of two vectors by evaluating the cosine of the angle between the vectors, which can be computed using a dot product of the two vectors divided by the lengths of the two vectors. Degree of similarity may include any other geometric measure of distance between vectors.

With continued reference to FIG. 1, language processing module may use a corpus of documents to generate associations between language elements in a language processing module may then use such associations to analyze words extracted from one or more documents and determine that the one or more documents indicate significance of a category. In an embodiment, language module and/or processor 102 may perform this analysis using a selected set of significant documents, such as documents identified by one or more experts as representing good information; experts may identify or enter such documents via graphical user interface or may communicate identities of significant documents according to any other suitable method of electronic communication, or by providing such identity to other persons who may enter such identifications into processor 102. Documents may be entered into a computing device by being uploaded by an expert or other persons using, without limitation, file transfer protocol (FTP) or other suitable methods for transmission and/or upload of documents; alternatively or additionally, where a document is identified by a citation, a uniform resource identifier (URI), uniform resource locator (URL) or other datum permitting unambiguous identification of the document, processor 102 may automatically obtain the document using such an identifier, for instance by submitting a request to a database or compendium of documents such as JSTOR as provided by Ithaka Harbors, Inc. of New York.

With continued reference to FIG. 1, processor 102 is configured to generate parameter training data 136. For the purposes of this disclosure, "parameter training data" is data containing correlations that a machine-learning process may use to model relationships between user data and user parameters. Parameter training data 136 includes correlations between exemplary second user data and exemplary second user parameters. In some embodiments, parameter training data 136, may include correlations between exemplary first user data and exemplary first user parameters. In some embodiments, parameter training data 136 may be stored in data store. In some embodiments, parameter training data 136 may be received from one or more users, data store, external computing devices, and/or previous iterations of processing. As a non-limiting example, parameter training data 136 may include instructions from a user, who may be an expert user, a past user in embodiments disclosed herein, or the like, which may be stored in memory and/or stored in data store, where the instructions may include labeling of training examples. In some embodiments, parameter training data 136 may be updated iteratively on a feedback loop. As a non-limiting example, processor 102 may update parameter training data 136 iteratively through a feedback loop as a function of first user data 106, previously used first user parameters, or the like. In some embodiments, processor 102 may be configured to generate parameter machine-learning model 138. In a non-limiting example, generating parameter machine-learning model 138 may include training, retraining, or fine-tuning parameter machine-learning model 138 using parameter training data 136 or updated parameter training data 136. Processor 102 is configured to determine second user parameters 134 using parameter machine-learning model 138 (i.e. trained or updated parameter machine-learning model 138). In some embodiments, processor 102 may be configured to determine first user parameters 124 using parameter machine-learning model 138. In some embodiments, parameter machine-learning model 138 may include a classifier described in this disclosure. In some embodiments, generating training data and training machine-learning models may be simultaneous.

With continued reference to FIG. 1, memory 104 contains instructions configuring processor 102 to determine a field datum 140 associated with at least a first user 108 as a function of temporal datum 126 of a plurality of first user parameters 124. For the purposes of this disclosure, a "field datum" is a data element that identifies first user data to be entered into a data field within a first user data structure. In some embodiments, field datum 140 may include Boolean value; for instance, yes/no, selected/not selected, eligible/ineligible, and the like. In a non-limiting example, field datum 140 may act as a criterion or eligibility check to determine whether a first user 108 qualifies to be entered into a data field 142 within a first user data structure 144. The data field 142 and first user data structure 144 disclosed herein are described further in detail below. In some embodiments, field datum 140 may function as a gatekeeping element, ensuring that only first users 108 having specific first user parameters or conditions are allowed to populate data fields 142 within first user data structure 144. For example, and without limitation, a field datum 140 may verify that a first user 108 has a valid operational license (credential 112), or satisfies certain service capabilities (first user parameters 124), such as maintaining a minimum inventory threshold or processing a specified number of orders daily. In some embodiments, processor 102 may compare first user parameter 124 against pre-established eligibility criteria or second user parameter 134, and only upon passing this check is first user data 106 recorded or processed within a data field 142 of first user data structure 144. The second user parameter 134 disclosed herein is further described in detail below.

With continued reference to FIG. 1, in some embodiments, processor 102 may determine field datum 140 as a function of a selection criteria. For the purposes of this disclosure, a "selection criteria" is a set of conditions or thresholds to determine a field datum. As a non-limiting example, selection criteria may include quantitative factors, such as numerical thresholds (e.g., time durations, capacity limits, inventory levels). As another non-limiting example, selection criteria may include qualitative factors, such as categorical matches (e.g., location, user type, status). For instance, and without limitation, selection criteria may include checking whether the turnaround time for prescription processing is within a specified limit, whether the inventory of a specific medication is above a required threshold, or whether the pharmacy is located within a particular service area. In some embodiments, selection criteria may include first user parameter 124. In some embodiments, processor 102 may retrieve selection criteria from data store. In some embodiments, user may manually input selection criteria into processor 102.

With continued reference to FIG. 1, in some embodiments, memory 104 contains instructions configuring processor 102 to access a first user data structure 144. First user data structure 144 includes a plurality of data fields 142 corresponds to a plurality of selected first users 146. For the purposes of this disclosure, a "first user data structure" is a structured organization of data related to first users. In some embodiments, first user data structure 144 may provide a summarization, representation, or otherwise abstraction of first user data 106. As a non-limiting example, first user data structure 144 may include a list of selected first users 146. For the purposes of this disclosure, a "selected first user" is a first user that meets a certain criteria. In a non-limiting example, first user 108 that has field datum 140 that indicates that the first user meets selection criteria or first user parameter 124, processor 102 may determine first user 108 as selected first user 146. For example, and without limitation, selected first user may be a pharmacy that have sufficient inventory to fulfill a prescription order or have the capacity to process an order within a specified turnaround time. For the purposes of this disclosure, a "data field" is a unit of information within a first user data structure.

With continued reference to FIG. 1, memory 104 contains instructions configuring processor 102 to update first user data structure 144 as a function of field datum 140. Updating first user data structure 144 includes updating a plurality of data fields 142 to include first user data 106 associated with a first user of a plurality of first users 108 related to field datum 140. In a non-limiting example, when processor 102 determines field datum 140 that indicates a first user 108 meets selection criteria, the first user 108 may be entered into first user data structure 144, becoming a selected first user 146. Updating plurality of data fields 142 may include adding, modifying, deleting a data field 142 associated with first user 108 in the plurality of data fields 142 associated with selected first user 146.

With continued reference to FIG. 1, processor 102 is configured to receive second user data 148 associated with at least a second user 110. For the purposes of this disclosure, "second user data" is data related to a second user. For the purposes of this disclosure, a "second user" is an individual, entity or organization that seeks or receives services from a first user. As a non-limiting example, second user 110 may include a prescriber. For the purposes of this disclosure, a "prescriber" is a healthcare professional who is authorized to prescribe medications for patients. As a non-limiting example, second user data 148 may include specific medications that second user 110 want to provide to patient. For example, and without limitation, second user data 148 may include prescription and associated metadata. As a non-limiting example, second user data 148 may include second user's name, age, date of birth, gender, address, contact information, allergies, religion, and the like. As another non-limiting example, second user data 148 may include second user's medical history including past diagnoses, previous treatments, previous trials of alternative treatments or medications, previous treatment response, surgeries, hospitalizations, or the like. As another non-limiting example, second user data 148 may include second user's current diagnosis, current medical condition, severity of the condition, overall health status, or the like. As another non-limiting example, second user data 148 may include information of second user's carrier, such as but not limited to the carrier's name, policy number, or the like.

With continued reference to FIG. 1, in some embodiments, processor 102 may receive second user data 148 from a second user device 150. For the purposes of this disclosure, a "second user device" is any device a second user use to input data. As a non-limiting example, second user device 150 may include a laptop, desktop, tablet, mobile phone, smart phone, smart watch, kiosk, screen, smart headset, or things of the like. In some embodiments, second user device 150 may include an interface configured to receive inputs from second user 110. In some embodiments, second user 110 may manually input any data into apparatus 100 using second user device 150. In some embodiments, second user 110 may have a capability to process, store or transmit any information independently.

With continued reference to FIG. 1, processor 102 is configured to identify at least a second user parameter 134 from second user data 148. In some embodiments, processor 102 may be configured to determine at least one selected first user 146 from a plurality of first users 108 as a function of at least a second user parameter 134 and a plurality of updated data fields 142. For the purposes of this disclosure, a "second user parameter" is a variable or factor within second user data that is associated with a concept, attribute, or operation related to a second user. As a non-limiting example, second user parameter 134 may include keywords related to a second user. For example, and without limitation, second user parameter 134 may include keywords related to a name of medication, date or duration that a second user 110 wants a medication to be prepared, location that a second user 110 wants a first user 108 to be, and the like. In some embodiments, second user parameter 134 may include location datum 130. For example, and without limitation, location datum 130 may include information related to a street address or geographic coordinates of a second user. In some embodiments, processor 102 may retrieve second user parameter 134 from a data store. In some embodiments, user may manually determine second user parameter 134 from second user data 148. In some embodiments, processor 102 may determine at least one selected first user 146 when selected first user 146 in data fields 142 of first user data structure 144 matches with first user parameter 124.

With continued reference to FIG. 1, updating first user data structure 144 includes transmitting a notification 152 as a function of updated data fields 142. For the purposes of this disclosure, a "notification" is an indication to inform a user. As a non-limiting example, notification 152 may indicate a first user about being selected as a selected first user 146 (e.g., entered into a data field 142 of a first user data structure 144). In some embodiments, processor 102 may transmit notification 152 to first user device 118. In some embodiments, notification 152 may include audio, text, image, vibration, and the like. In some embodiments, notification 152 may include a text message, notification sound, phone call, notification banner, or the like. In a non-limiting example, processor 102 may generate and transmit notification 152 to first user device 118 to inform that selected first user 146 is determined, or the like. In some embodiments, notification 152 may be stored in database. In some embodiments, notification 152 may be retrieved from database. In some embodiments, transmitting notification 152 may include transmitting the notification 152 to a first user device 118 and a second user device 150.

With continued reference to FIG. 1, in some embodiments, transmitting notification 152 may include receiving a first user input 114 for notification 152. For the purposes of this disclosure, a "first user input" is an input that is generated by a first user. In some embodiments, first user input 114 may include a status change of a plurality of first user parameters 124. For the purposes of this disclosure, a "status change" of a plurality of first user parameters is an update or modification to a value or state of a first user parameter. As a non-limiting example, first user input 114 may include a status change of a prescription order process. For example, and without limitation, first user input 114 may include a status change of a prescription order process from "received" to "processing," from "processing" to "ready for pickup," or from "ready for pickup" to "delivered." For example, and without limitation, a first user parameter 124 such as inventory level might change status to reflect a reduction in stock or an increase. For example, and without limitation, a turnaround time may be updated to reflect faster processing. In some embodiments, transmitting notification 152 may include transmitting a second notification 154 for at least a second user 110 as a function of a first user input 114. For the purposes of this disclosure, a "second notification" is an indication to inform a change in a user parameter. In some embodiments, processor 102 may transmit second notification 154 to second user device 150. In some embodiments, second notification 154 may include audio, text, image, vibration, and the like. In some embodiments, second notification 154 may include a text message, second notification sound, phone call, second notification banner, or the like. In a non-limiting example, processor 102 may generate and transmit second notification 154 to second user device 150 to inform that selected second user 110 is determined, or the like. In some embodiments, second notification 154 may be stored in database. In some embodiments, second notification 154 may be retrieved from database. In some embodiments, processor 102 may transmit second notification 154, first user data structure 144, selected first users 146, and the like to a second user device 150. In some embodiments, processor 102 may generate second user interface 156 displaying second notification 154, first user data structure 144, selected first users 146, and the like.

With continued reference to FIG. 1, in some embodiments, transmitting notification 152 may include generating a first user interface 116 displaying notification 152. For the purposes of this disclosure, a "first user interface" is a means by which a first user and a computer system interact; for example through the use of input devices and software. For the purposes of this disclosure, a "user interface" is a means by which a user and a computer system interact; for example through the use of input devices and software. A user interface may include a graphical user interface (GUI) 158, command line interface (CLI), menu-driven user interface, touch user interface, voice user interface (VUI), form-based user interface, any combination thereof and the like. In some embodiments, user interface may operate on and/or be communicatively connected to a decentralized platform, metaverse, and/or a decentralized exchange platform associated with the user. For example, a user may interact with user interface in virtual reality. In some embodiments, a user may interact with the use interface using a computing device distinct from and communicatively connected to at least a processor 102. For example, a smart phone, smart, tablet, or laptop operated by a first user 108 or second user 110. In an embodiment, user interface may include a graphical user interface 158. A "graphical user interface," as used herein, is a graphical form of user interface that allows users to interact with electronic devices. In some embodiments, GUI 158 may include icons, menus, other visual indicators or representations (graphics), audio indicators such as primary notation, and display information and related user controls. A menu may contain a list of choices and may allow users to select one from them. A menu bar may be displayed horizontally across the screen such as pull-down menu. When any option is clicked in this menu, then the pull-down menu may appear. A menu may include a context menu that appears only when the user performs a specific action. An example of this is pressing the right mouse button. When this is done, a menu may appear under the cursor. Files, programs, web pages and the like may be represented using a small picture in a graphical user interface 158. For example, links to decentralized platforms as described in this disclosure may be incorporated using icons. Using an icon may be a fast way to open documents, run programs etc. because clicking on them yields instant access.

With continued reference to FIG. 1, in some embodiments, receiving first user input 114 may include receiving the first user input 114 through one or more input event handlers 160. An "input event handler" as used in this disclosure is a callback routine that operates asynchronously once an event takes place. Input event handlers 160 may include, without limitation, one or more programs to perform one or more actions based on user input, such as generating pop-up windows, submitting forms, changing background colors of a webpage, and the like. Input event handlers 160 may be programmed for specific user input (e.g., first user input 114), such as, but not limited to, mouse clicks, mouse hovering, touchscreen input, keystrokes, and the like. In some embodiments, first user input 114 may correspond to a visual element 162 of a graphical user interface 158. For the purposes of this disclosure, a "visual element" is any graphical component displayed within a graphical user interface. As a non-limiting example, visual element 162 may include, but is not limited to, icons, buttons, menus, sliders, text fields, images, graphs, or other graphical representations that facilitate user interaction with the system. For instance and without limitation, an input event handler 160 may be programmed to generate a pop-up window if a user double clicks on a specific icon. User input may include manipulation of computer icons, such as, but not limited to, clicking, selecting, dragging and dropping, scrolling, and the like. In some embodiments, user input (e.g., first user input 114) may include an entry of characters and/or symbols in a user input field. A "user input field" as used in this disclosure is a portion of a graphical user interface configured to receive data from an individual. A user input field may include, but is not limited to, text boxes numerical fields, search fields, filtering fields, and the like. In some embodiments, user input may include touch input. Touch input may include, but is not limited to, single taps, double taps, triple taps, long presses, swiping gestures, and the like. One of ordinary skill in the art will appreciate the various ways a user may interact with GUI 158.

With continued reference to FIG. 1, in some embodiments, updating the plurality of data fields 142 may include updating the plurality of data fields 142 as a function of first user input 114, wherein the first user input 114 may include a first rejection input 164. For the purposes of this disclosure, a "first rejection input" is a user input provided by a first user to indicate a decision to reject the selection for fulfilling a second user's request. In a non-limiting example, first user 108 may input first rejection input 164 for insufficient inventory to fulfill the order, inability to meet the required turnaround time, geographic limitations for delivery, or operational constraints such as temporary closure or system outages. In some embodiments, first rejection input 164 may be entered through a graphical user interface (GUI). For example, and without limitation, first user 108 may select a "reject" button, providing a specific reason for rejection, or marking the order as "unable to fulfill." In a non-limiting example, processor 102 may remove first user data 106 from first user data structure 144 as a function of first rejection input 164.

With continued reference to FIG. 1, in some embodiments, transmitting notification 152 may include receiving a second user input 166 for the notification 152, wherein the second user input 166 may include a second rejection input 170 and updating plurality of data fields 142 as a function of the second rejection input 170. For the purposes of this disclosure, a "second user input" is an input that is inputted into a processor by a second user. For example, and without limitation, a second user input 166 may include the submission of a prescription order for a patient, specifying details such as the medication type, dosage, and duration of treatment. For example, and without limitation, a second user input 166 may include modifying an existing prescription, canceling a previous order, or adding notes regarding a patient's medical condition or treatment preferences. For example, and without limitation, a second user input 166 may include eligibility or preference indicators, such as selecting a preferred pharmacy for order fulfillment or specifying time-sensitive delivery requirements. In some embodiments, processor 102 may receive second user input 166 from second user device 150.

With continued reference to FIG. 1, for the purposes of this disclosure, a "second rejection input" is a user input provided by a second user to indicate a decision to reject the selection of a first user. As a non-limiting example, second rejection input 170 may include a clinician (second user 110) determining that a selected pharmacy (first user 108) cannot meet the patient's needs due to inventory constraints, location issues, or excessive turnaround time. As another non-limiting example, second rejection input 170 may include rejection for an automated suggestion (first user 108 determined using field datum 140). In some embodiments, second rejection input 170 may be entered through a graphical user interface (GUI). For example, and without limitation, second user 110 may select a "reject" button, providing a specific reason for rejection. In a non-limiting example, processor 102 may remove first user data 106 from first user data structure 144 as a function of second rejection input 170.

With continued reference to FIG. 1, in some embodiments, identifying at least a second user parameter 134 may include identifying a geofence 176 as a function of second user data 148 and determining a location datum 130 of the at least a second user parameter 134 as a function of the geofence 176. In one or more embodiments, receiving second user data 148 may include aggregating second user data 148 associated with a plurality of second users 110, wherein each second user 110 of the plurality of second users 110 is associated with a geographical location (geolocation). Such geographical location may pertain to a location from which an inquiry, order, purchase, or the like is placed, and the like. A geographical location may include or pertain to a specific address, a street name, a neighborhood name, a county name, a city name, a jurisdiction, a state, a country, and/or a continent. A geographical location may include or pertain to a zip code or area code. A geographical location may be specified by a combination of longitude and latitude. Accordingly, in such embodiments, processor 102 may be configured to categorize or filter second user data 148, using a geofence 176, as a function of user's geographical location. In some cases, certain inclusion/exclusion criteria may be applied to a plurality of second users 110 and/or second user data 148 to selectively isolate the portion thereof within geofence 176. Such processing steps may provide insights regarding where users are distributed across different geographical locations and/or help identify existing or potential markets to target. Such processing steps may also enable a more accurate analysis regarding second user data 148 in a specified location or area. For purposes of this disclosure, a "geofence" or "geofenced area" is a virtual perimeter or boundary defined by geographic coordinates in a digital mapping system. Geographical coordinates may include a radius from a geographical point, proximity to a landmark, zip codes, area codes, longitude and latitude, cities, states, countries, counties, travel time, and/or the like, consistent with details described above. A geofence may be generated as a radius around a point or location (e.g., a detected location of user based on an associated IP address) or using arbitrary borders drawn by user (e.g., the borders a neighborhood). In some embodiments, the point or location may be explicitly or implicitly provided by a user, during their interaction with apparatus 100, through one or more secondary inputs, which may include, as nonlimiting examples, tapping on a screen, inputting an address, inputting coordinates, and/or the like. Geofences 176 may be generated to match a predetermined set of boundaries such as neighborhoods, school zones, zip codes, county, state, and city limits, area codes, voting districts, geographic regions, streets, rivers, other landmarks, and/or the like. In one or more embodiments, a geofence 176 may be generated as a function of second user data 148 using one or more addresses detected therein. Geofences may be used in location-based services and applications to trigger specific actions or events when a mobile device or GPS-enabled object enters, exits, or remains within a designated area.

Figure 2:
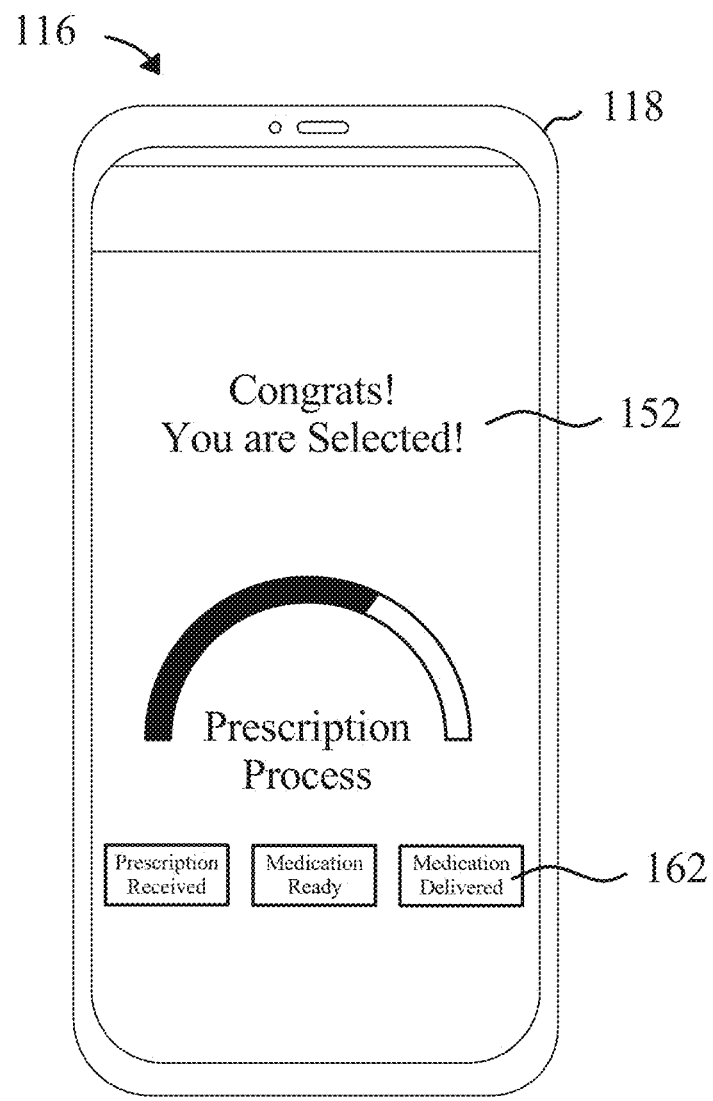
FIG. 2 illustrates an exemplary first user interface.

Referring now to FIG. 2, an exemplary first user interface 116 on a first user device 118 is illustrated. In some embodiments, first user interface 116 may display notification 152, visual elements 162, and the like. As a non-limiting example, first user interface 116 may display notification 152 that indicating that a first user 108 is selected as selected first user 146 or entered into a data field 142 of first user data structure 144. As another non-limiting example, first user interface 116 may display visual elements 162 allowing first user 108 to input a first user input 114. For example, and without limitation, visual elements 162 may include buttons that first user 108 can click to input at least a first user input 114 indicating a confirmation of receipt of a prescription order, manufacturing process of prescriptions, and the like.

Figure 3:
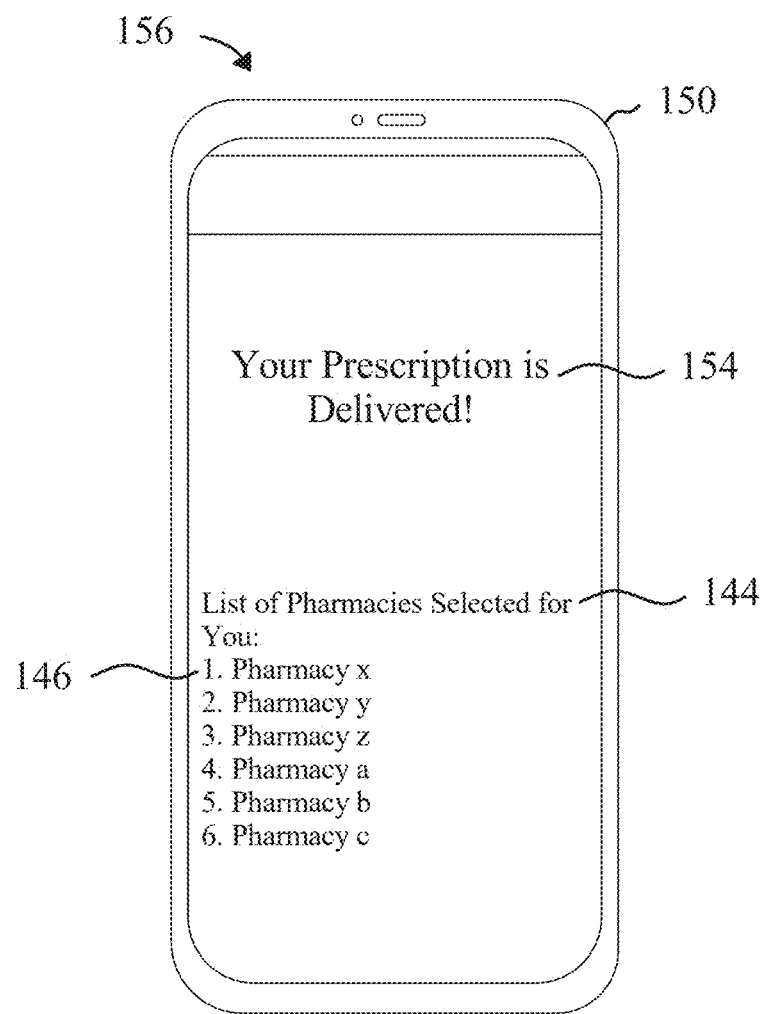
FIG. 3 illustrates an exemplary second user interface.

Referring now to FIG. 3, an exemplary second user interface 156 on a second user device 150 is illustrated. In some embodiments, second user interface 156 may display a second notification 154, first user data structure 144, selected first users 146, and the like. As a non-limiting example, second user interface 156 may display a second notification 154 indicating that a process of prescription orders that was made by a second user 110. In some embodiments, second user 110 may interact with second user interface 156 to select at least one 'selected first user 146' from a displayed list of selected first users 146 (e.g., first user data structure 144).

Figure 4:
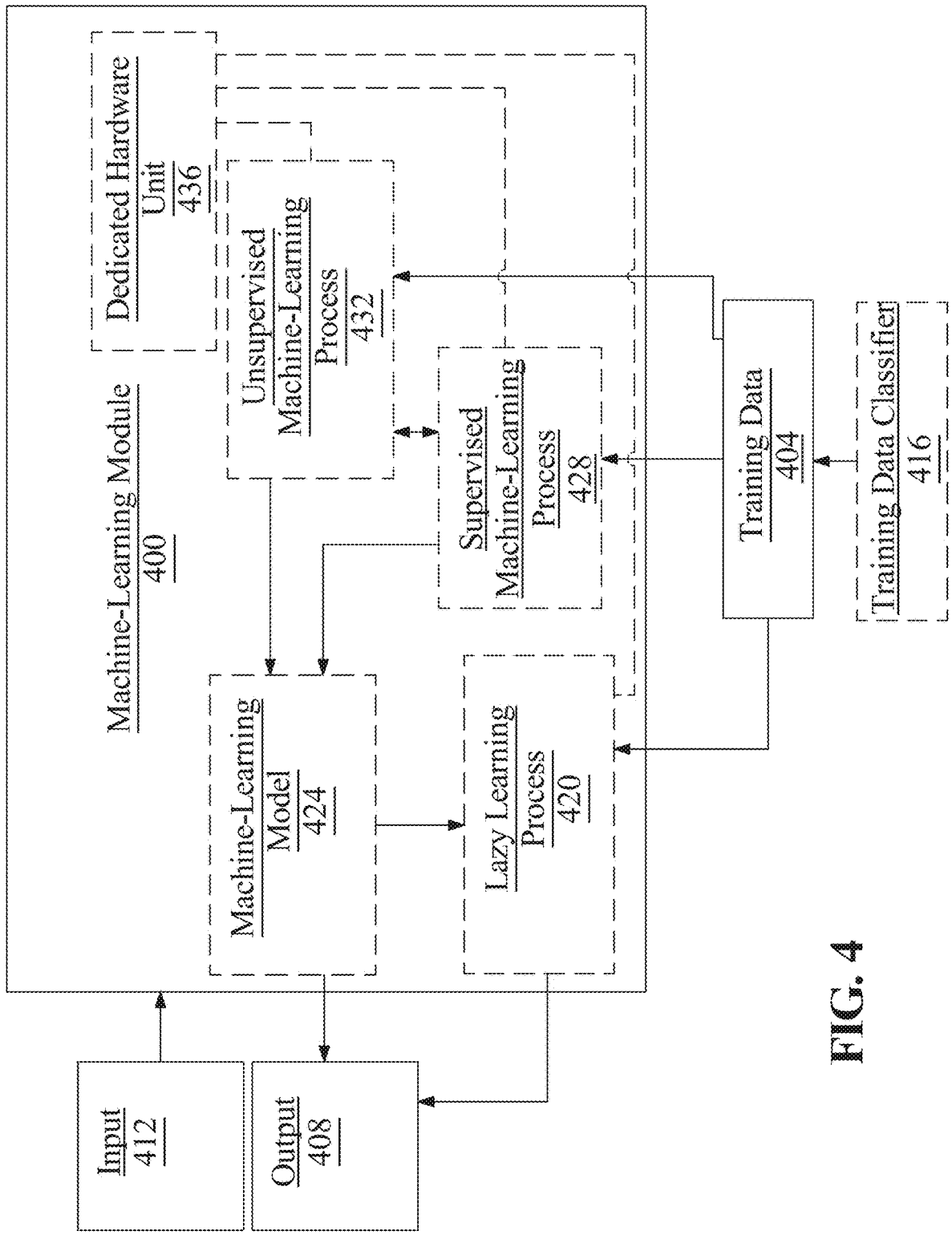
FIG. 4 illustrates a block diagram of an exemplary machine-learning module.

Referring now to FIG. 4, an exemplary embodiment of a machine-learning module 400 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 404 to generate an algorithm instantiated in hardware or software logic, data structures, and/or functions that will be performed by a computing device/module to produce outputs 408 given data provided as inputs 412; this is in contrast to a non-machine learning software program where the commands to be executed are determined in advance by a user and written in a programming language.

Still referring to FIG. 4, "training data," as used herein, is data containing correlations that a machine-learning process may use to model relationships between two or more categories of data elements. For instance, and without limitation, training data 404 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 404 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 404 according to various correlations; correlations may indicate causative and/or predictive links between categories of data elements, which may be modeled as relationships such as mathematical relationships by machine-learning processes as described in further detail below. Training data 404 may be formatted and/or organized by categories of data elements, for instance by associating data elements with one or more descriptors corresponding to categories of data elements. As a non-limiting example, training data 404 may include data entered in standardized forms by persons or processes, such that entry of a given data element in a given field in a form may be mapped to one or more descriptors of categories. Elements in training data 404 may be linked to descriptors of categories by tags, tokens, or other data elements; for instance, and without limitation, training data 404 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 4, training data 404 may include one or more elements that are not categorized; that is, training data 404 may not be formatted or contain descriptors for some elements of data. Machine-learning algorithms and/or other processes may sort training data 404 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 404 to be made applicable for two or more distinct machine-learning algorithms as described in further detail below. Training data 404 used by machine-learning module 400 may correlate any input data as described in this disclosure to any output data as described in this disclosure. As a non-limiting illustrative example, input data may include first user data 106, first user parameter 124, field datum 140, and the like. As another non-limiting illustrative example, output data may include first user parameters 124, field datum 140, and the like.

Further referring to FIG. 4, training data may be filtered, sorted, and/or selected using one or more supervised and/or unsupervised machine-learning processes and/or models as described in further detail below; such models may include without limitation a training data classifier 416. Training data classifier 416 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 400 may generate a classifier using a classification algorithm, defined as a processes whereby a computing device and/or any module and/or component operating thereon derives a classifier from training data 404. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 416 may classify elements of training data to first user cohort related to first user's location, size, and the like. As another non-limiting example, training data classifier 416 may classify elements of training data to second user cohort related to second user's location, age, gender, experience, and the like.

Still referring to FIG. 4, computing device may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B) = P(B/A) P(A) \pm P(B)$, where $P(A/B)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and $P(B)$ is the probability of the data regardless of the hypothesis. A naïve Bayes algorithm may be generated by first transforming training data into a frequency table. Computing device may then calculate a likelihood table by calculating probabilities of different data entries and classification labels. Computing device may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 4, computing device may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 4, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With further reference to FIG. 4, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Continuing to refer to FIG. 4, computer, processor, and/or module may be configured to preprocess training data. "Preprocessing" training data, as used in this disclosure, is transforming training data from raw form to a format that can be used for training a machine learning model. Preprocessing may include sanitizing, feature selection, feature scaling, data augmentation and the like.

Still referring to FIG. 4, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value. Sanitizing may include steps such as removing duplicative or otherwise redundant data, interpolating missing data, correcting data errors, standardizing data, identifying outliers, and the like. In a nonlimiting example, sanitization may include utilizing algorithms for identifying duplicate entries or spell-check algorithms.

As a non-limiting example, and with further reference to FIG. 4, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 4, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 4, computing device, processor, and/or module may down-sample elements of a training example to a desired lower number of data elements. As a non-limiting example, a high pixel count image may have 256 pixels, however a desired number of pixels may be 128. Processor may down-sample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Further referring to FIG. 4, feature selection includes narrowing and/or filtering training data to exclude features and/or elements, or training data including such elements, that are not relevant to a purpose for which a trained machine-learning model and/or algorithm is being trained, and/or collection of features and/or elements, or training data including such elements, on the basis of relevance or utility for an intended task or purpose for a trained machine-learning model and/or algorithm is being trained. Feature selection may be implemented, without limitation, using any process described in this disclosure, including without limitation using training data classifiers, exclusion of outliers, or the like.

With continued reference to FIG. 4, feature scaling may include, without limitation, normalization of data entries, which may be accomplished by dividing numerical fields by norms thereof, for instance as performed for vector normalization. Feature scaling may include absolute maximum scaling, wherein each quantitative datum is divided by the maximum absolute value of all quantitative data of a set or subset of quantitative data. Feature scaling may include min-max scaling, in which each value X has a minimum value $X_{min}$ in a set or subset of values subtracted therefrom, with the result divided by the range of the values, give maximum value in the set or subset $$X_{max}: X_{new} = \frac{X - X_{min}}{X_{max} - X_{min}}.$$

Feature scaling may include mean normalization, which involves use of a mean value of a set and/or subset of values, $X_{mean}$ with maximum and minimum values:

$$X_{new} = \frac{X - X_{mean}}{X_{max} - X_{min}}.$$

Feature scaling may include standardization, where a difference between X and $X_{mean}$ is divided by a standard deviation $\sigma$ of a set or subset of values:

$$X_{new} = \frac{X - X_{mean}}{\sigma}.$$

Scaling may be performed using a median value of a set or subset $X_{median}$ and/or interquartile range (IQR), which represents the difference between the $25^{th}$ percentile value and the $50^{th}$ percentile value (or closest values thereto by a rounding protocol), such as:

$$X_{new} = \frac{X - X_{median}}{IQR}.$$

Persons skilled in the art, upon reviewing the entirety of this disclosure, will be aware of various alternative or additional approaches that may be used for feature scaling.

Further referring to FIG. 4, computing device, processor, and/or module may be configured to perform one or more processes of data augmentation. "Data augmentation" as used in this disclosure is addition of data to a training set using elements and/or entries already in the dataset. Data augmentation may be accomplished, without limitation, using interpolation, generation of modified copies of existing entries and/or examples, and/or one or more generative AI processes, for instance using deep neural networks and/or generative adversarial networks; generative processes may be referred to alternatively in this context as "data synthesis" and as creating "synthetic data." Augmentation may include performing one or more transformations on data, such as geometric, color space, affine, brightness, cropping, and/or contrast transformations of images.

Still referring to FIG. 4, machine-learning module 400 may be configured to perform a lazy-learning process 420 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 404. Heuristic may include selecting some number of highest-ranking associations and/or training data 404 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 4, machine-learning processes as described in this disclosure may be used to generate machine-learning models 424. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 424 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 424 may be generated by creating an artificial neural network, such as a convolutional neural network comprising an input layer of nodes, one or more intermediate layers, and an output layer of nodes. Connections between nodes may be created via the process of "training" the network, in which elements from a training data 404 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 4, machine-learning algorithms may include at least a supervised machine-learning process 428. At least a supervised machine-learning process 428, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include first user data 106, first user parameter 124, field datum 140, and the like as described above as inputs, first user parameters 124, field datum 140, and the like as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 404. Persons skilled in the art, upon reviewing the entirety of this disclosure, will be aware of various possible variations of at least a supervised machine-learning process 428 that may be used to determine relation between inputs and outputs. Supervised machine-learning processes may include classification algorithms as defined above.

With further reference to FIG. 4, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 4, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 4, machine learning processes may include at least an unsupervised machine-learning processes 432. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 432 may not require a response variable; unsupervised processes 432 may be used to find interesting patterns and/or inferences between variables, to determine a degree of correlation between two or more variables, or the like.

Still referring to FIG. 4, machine-learning module 400 may be designed and configured to create a machine-learning model 424 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 4, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 4, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 4, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 4, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 4, one or more processes or algorithms described above may be performed by at least a dedicated hardware unit 436. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 436 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 436 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 436 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 5:
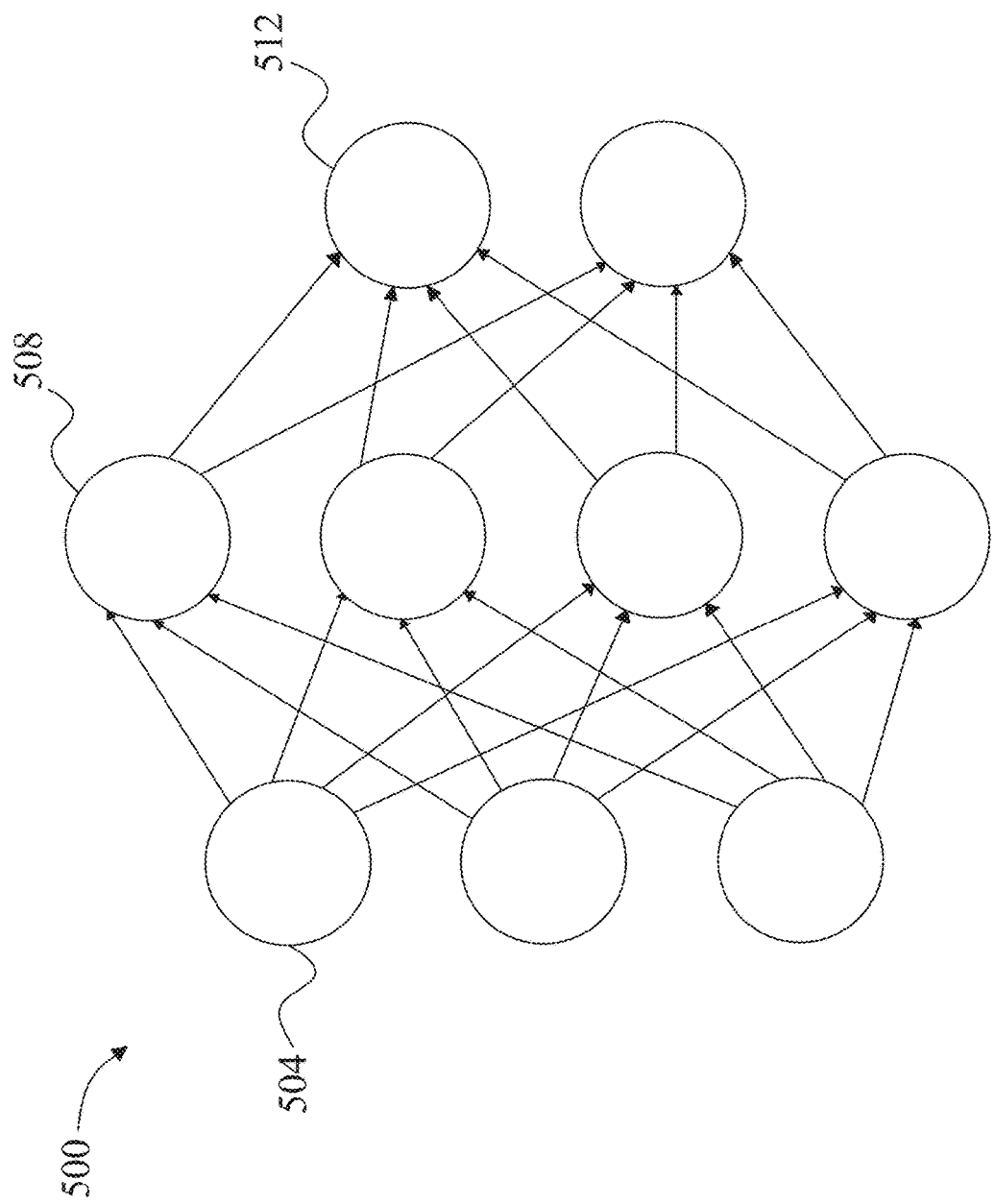
FIG. 5 illustrates a diagram of an exemplary neural network.

Referring now to FIG. 5, an exemplary embodiment of neural network 500 is illustrated. A neural network 500 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 504, one or more intermediate layers 508, and an output layer of nodes 512. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network, or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 6:
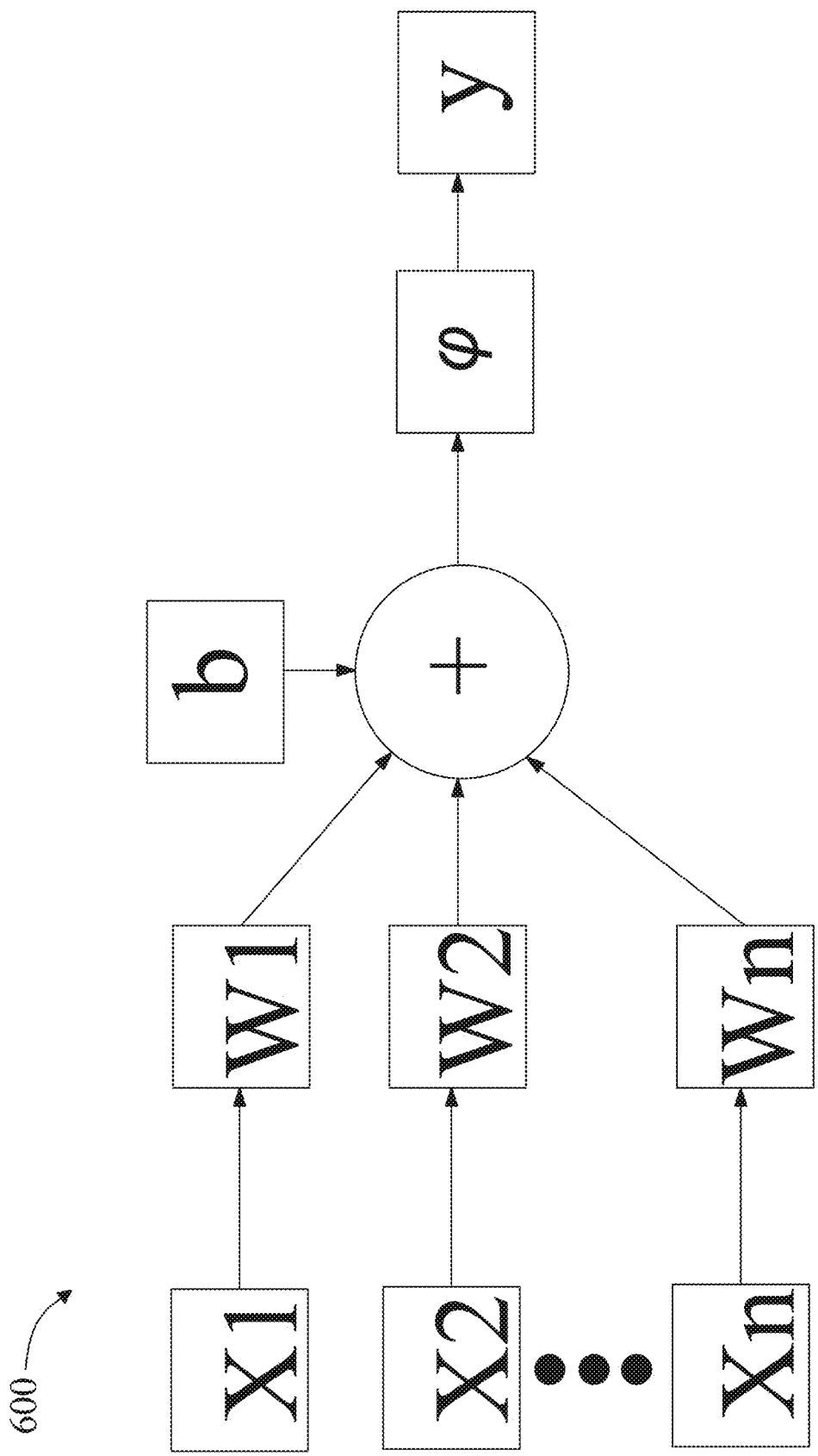
FIG. 6 illustrates a block diagram of an exemplary node in a neural network.

Referring now to FIG. 6, an exemplary embodiment of a node 600 of a neural network is illustrated. A node may include, without limitation a plurality of inputs $x_i$ that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1-e^{-x}}$$

given input x, a tanh (hyperbolic tangent) function, of the form $$\frac{e^x - e^{-x}}{e^x + e^{-x}},$$

a tanh derivative function such as ƒ(x)=tanh²(x), a rectified linear unit function such as ƒ(x)=max(0, x), a "leaky" and/or "parametric" rectified linear unit function such as ƒ(x)=max (ax, x) for some a, an exponential linear units function such as $$f(x) = \begin{cases} \alpha(e^x - 1) & \text{for } x < 0 \\ x & \text{for } x \geq 0 \end{cases}.$$

for some value of α (this function may be replaced and/or weighted by its own derivative in some embodiments), a softmax function such as $$f(x_i) = \frac{e^x}{\sum_i x_i}$$

where the inputs to an instant layer are $x_i$, a swish function such as ƒ(x)=x*sigmoid(x), a Gaussian error linear unit function such as f(x)=a(1+tanh(√2/π(x+bx^r))) for some values of a, b, and r, and/or a scaled function such as $$f(x) = \lambda \begin{cases} \alpha(e^x - 1) & \text{for } x < 0 \\ x & \text{for } x \geq 0 \end{cases}.$$

Fundamentally, there is no limit to the nature of functions of inputs $x_i$ that may be used as activation functions. As a non-limiting and illustrative example, node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 7:
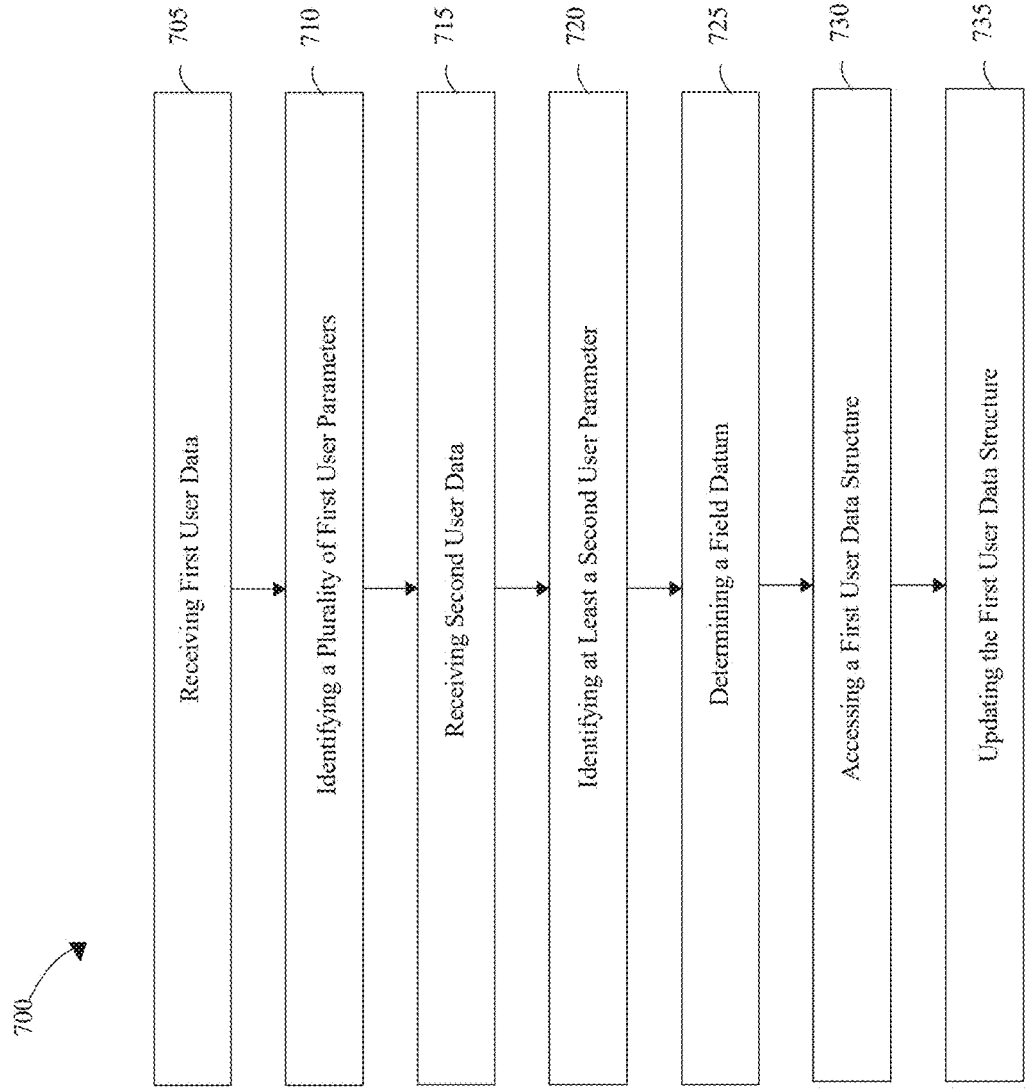
FIG. 7 illustrates a flow diagram of an exemplary method for updating a user data structure.

Referring now to FIG. 7, a flow diagram of an exemplary method 700 for updating a user data structure is illustrated. Method 700 contains a step 705 of receiving, using at least a processor, first user data associated with a plurality of first users. In some embodiments, receiving the first user data may include authenticating the plurality of first users as a function of credentials. These may be implemented as reference to FIGS. 1-6.

With continued reference to FIG. 7, method 700 contains a step 710 of identifying, using the at least a processor, a plurality of first user parameters from the first user data, wherein identifying the plurality of first user parameters includes determining a temporal datum of the plurality of first user parameters as a function of a time gap between sequential time markers of time markers of the first user data. In some embodiments, the plurality of first user parameters may include an element storage datum. These may be implemented as reference to FIGS. 1-6.

With continued reference to FIG. 7, method 700 contains a step 715 of receiving, using the at least a processor, second user data associated with at least a second user. This may be implemented as reference to FIGS. 1-6.

With continued reference to FIG. 7, method 700 contains a step 720 of identifying, using the at least a processor, at least a second user parameter from the second user data, wherein identifying the at least a second user parameter includes generating parameter training data, wherein the parameter training data includes exemplary second user data correlated to exemplary second user parameters, training a parameter machine-learning model using the parameter training data and determining the at least a second user parameter using the trained parameter machine-learning model. In some embodiments, identifying the at least a second user parameter may include identifying a geofence as a function of the second user data and determining a location datum of the at least a second user parameter as a function of the geofence. These may be implemented as reference to FIGS. 1-6.

With continued reference to FIG. 7, method 700 contains a step 725 of determining, using the at least a processor, a field datum associated with the plurality of first user as a function of the temporal datum of the plurality of first user parameters and the at least a second user parameter. These may be implemented as reference to FIGS. 1-6.

With continued reference to FIG. 7, method 700 contains a step 730 of accessing, using the at least a processor, a first user data structure, wherein the first user data structure includes a plurality of data fields corresponds to a plurality of selected first users. These may be implemented as reference to FIGS. 1-6.

With continued reference to FIG. 7, method 700 contains a step 735 of updating, using the at least a processor, the first user data structure as a function of the field datum, wherein updating the first user data structure includes updating the plurality of data fields to include the first user data associated with a first user of the plurality of first users related to the field datum and transmitting a notification as a function of the plurality of updated data fields. In some embodiments, transmitting the notification may include receiving a first user input for the notification, wherein the first user input may include a status change of the plurality of first user parameters and transmitting a second notification to the at least a second user as a function of the first user input. In some embodiments, receiving the first user input may include receiving the first user input through one or more input event handlers, wherein the first user input corresponds to a visual element of a graphical user interface. In some embodiments, updating the plurality of data fields may include updating the plurality of data fields as a function of the first user input, wherein the first user input may include a first rejection input. In some embodiments, transmitting the notification may include generating a first user interface displaying the notification on a first user device, wherein the first user interface may include a graphical user interface. In some embodiments, transmitting the notification may include receiving a second user input for the notification, wherein the second user input may include a second rejection input and updating the plurality of data fields as a function of the second rejection input. In some embodiments, transmitting the notification may include transmitting the notification to a first user device and a second user device. These may be implemented as reference to FIGS. 1-6.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 8:
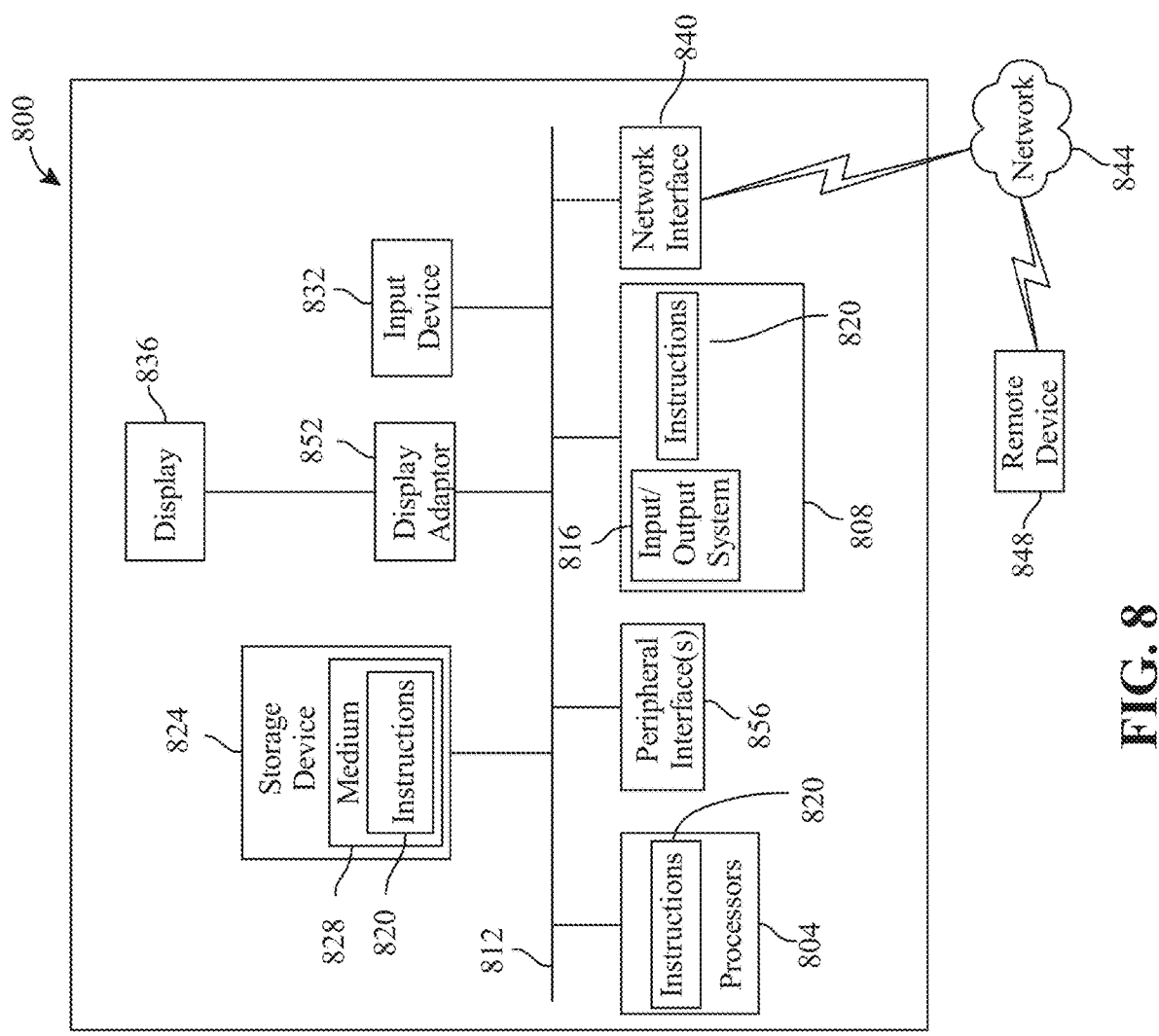
FIG. 8 illustrates a block diagram of a computing system that can be used to implement any one or more of the methodologies disclosed herein and any one or more portions thereof. The drawings are not necessarily to scale and may be illustrated by phantom lines, diagrammatic representations and fragmentary views. In certain instances, details that are not necessary for an understanding of the embodiments or that render other details difficult to perceive may have been omitted.

FIG. 8 shows a diagrammatic representation of one embodiment of a computing device in the exemplary form of a computer system 800 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 800 includes a processor 804 and memory 808 that communicate with each other, and with other components, via a bus 812. Bus 812 may include any of several types of bus structures including, but not limited to, memory bus, memory controller, a peripheral bus, a local bus, and any combinations thereof, using any of a variety of bus architectures.

Processor 804 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 804 may be organized according to Von Neumann and/or Harvard architecture as a non-limiting example. Processor 804 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 808 may include various components (e.g., machine-readable media) including, but not limited to, a random-access memory component, a read only component, and any combinations thereof. In one example, a basic input/output system 816 (BIOS), including basic routines that help to transfer information between elements within computer system 800, such as during start-up, may be stored in memory 808. Memory 808 may also include (e.g., stored on one or more machine-readable media) instructions (e.g., software) 820 embodying any one or more of the aspects and/or methodologies of the present disclosure. In another example, memory 808 may further include any number of program modules including, but not limited to, an operating system, one or more application programs, other program modules, program data, and any combinations thereof.

Computer system 800 may also include a storage device 824. Examples of a storage device (e.g., storage device 824) include, but are not limited to, a hard disk drive, a magnetic disk drive, an optical disc drive in combination with an optical medium, a solid-state memory device, and any combinations thereof. Storage device 824 may be connected to bus 812 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 824 (or one or more components thereof) may be removably interfaced with computer system 800 (e.g., via an external port connector (not shown)). Particularly, storage device 824 and an associated machine-readable medium 828 may provide nonvolatile and/or volatile storage of machine-readable instructions, data structures, program modules, and/or other data for computer system 800. In one example, software 820 may reside, completely or partially, within machine-readable medium 828. In another example, software 820 may reside, completely or partially, within processor 804.

Computer system 800 may also include an input device 832. In one example, a user of computer system 800 may enter commands and/or other information into computer system 800 via input device 832. Examples of an input device 832 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 832 may be interfaced to bus 812 via any of a variety of interfaces (not shown) including, but not limited to, a serial interface, a parallel interface, a game port, a USB interface, a FIREWIRE interface, a direct interface to bus 812, and any combinations thereof. Input device 832 may include a touch screen interface that may be a part of or separate from display 836, discussed further below. Input device 832 may be utilized as a user selection device for selecting one or more graphical representations in a graphical interface as described above.

A user may also input commands and/or other information to computer system 800 via storage device 824 (e.g., a removable disk drive, a flash drive, etc.) and/or network interface device 840. A network interface device, such as network interface device 840, may be utilized for connecting computer system 800 to one or more of a variety of networks, such as network 844, and one or more remote devices 848 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 844, may employ a wired and/or a wireless mode of communication. In general, any network topology may be used. Information (e.g., data, software 820, etc.) may be communicated to and/or from computer system 800 via network interface device 840.

Computer system 800 may further include a video display adapter 852 for communicating a displayable image to a display device, such as display 836. Examples of a display device include, but are not limited to, a liquid crystal display (LCD), a cathode ray tube (CRT), a plasma display, a light emitting diode (LED) display, and any combinations thereof. Display adapter 852 and display 836 may be utilized in combination with processor 804 to provide graphical representations of aspects of the present disclosure. In addition to a display device, computer system 800 may include one or more other peripheral output devices including, but not limited to, an audio speaker, a printer, and any combinations thereof. Such peripheral output devices may be connected to bus 812 via a peripheral interface 856. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods and apparatuses according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for updating a user data structure, the apparatus comprising:
   at least a processor; and
   a memory communicatively connected to the at least a processor, wherein the memory contains instructions configuring the at least a processor to:
      receive first user data associated with a plurality of first users;
      identify a plurality of first user parameters from the first user data, wherein identifying the plurality of first user parameters comprises determining a temporal datum of the plurality of first user parameters as a function of a time gap between sequential time markers of time markers of the first user data;
      receive second user data associated with at least a second user;
      identify at least a second user parameter from the second user data, wherein identifying the at least a second user parameter comprises:
         generating parameter training data, wherein the parameter training data comprises exemplary second user data correlated to exemplary second user parameters;
         training a parameter machine-learning model using the parameter training data; and
         determining the at least a second user parameter using the trained parameter machine-learning model;
      determine a field datum associated with the plurality of first users as a function of the temporal datum of the plurality of first user parameters and the at least a second user parameter;
      access a first user data structure, wherein the first user data structure comprises a plurality of data fields corresponds to a plurality of selected first users; and update the first user data structure as a function of the field datum, wherein updating the first user data structure comprises:
  updating the plurality of data fields to include the first user data associated with a first user of the plurality of first users related to the field datum; and
  transmitting a notification as a function of the plurality of updated data fields.

2. The apparatus of claim 1, wherein receiving the first user data comprises authenticating the plurality of first users as a function of credentials.

3. The apparatus of claim 1, wherein the plurality of first user parameters comprises an element storage datum.

4. The apparatus of claim 1, wherein identifying the at least a second user parameter comprises:
  identifying a geofence as a function of the second user data; and
  determining a location datum of the at least a second user parameter as a function of the geofence.

5. The apparatus of claim 1, wherein transmitting the notification comprises transmitting the notification to a first user device and a second user device.

6. The apparatus of claim 1, wherein transmitting the notification comprises:
  receiving a first user input for the notification, wherein the first user input comprises a status change of the plurality of first user parameters; and
  transmitting a second notification to the at least a second user as a function of the first user input.

7. The apparatus of claim 6, wherein receiving the first user input comprises receiving the first user input through one or more input event handlers, wherein the first user input corresponds to a visual element of a graphical user interface.

8. The apparatus of claim 6, wherein updating the plurality of data fields comprises updating the plurality of data fields as a function of the first user input, wherein the first user input comprises a first rejection input.

9. The apparatus of claim 1, wherein transmitting the notification comprises generating a first user interface displaying the notification on a first user device, wherein the first user interface comprises a graphical user interface.

10. The apparatus of claim 1, wherein transmitting the notification comprises:
  receiving a second user input for the notification, wherein the second user input comprises a second rejection input; and
  updating the plurality of data fields as a function of the second rejection input.

11. A method for updating a user data structure, the method comprising:
  receiving, using at least a processor, first user data associated with a plurality of first users;
  identifying, using the at least a processor, a plurality of first user parameters from the first user data, wherein identifying the plurality of first user parameters comprises determining a temporal datum of the plurality of first user parameters as a function of a time gap between sequential time markers of time markers of the first user data;
  receiving, using the at least a processor, second user data associated with at least a second user;
  identifying, using the at least a processor, at least a second user parameter from the second user data, wherein identifying the at least a second user parameter comprises:
    generating parameter training data, wherein the parameter training data comprises exemplary second user data correlated to exemplary second user parameters;
    training a parameter machine-learning model using the parameter training data; and
    determining the at least a second user parameter using the trained parameter machine-learning model;
  determining, using the at least a processor, a field datum associated with the plurality of first users as a function of the temporal datum of the plurality of first user parameters and the at least a second user parameter;
  accessing, using the at least a processor, a first user data structure, wherein the first user data structure comprises a plurality of data fields corresponds to a plurality of selected first users; and
  updating, using the at least a processor, the first user data structure as a function of the field datum, wherein updating the first user data structure comprises:
    updating the plurality of data fields to include the first user data associated with a first user of the plurality of first users related to the field datum; and
    transmitting a notification as a function of the plurality of updated data fields.

12. The method of claim 11, wherein receiving the first user data comprises authenticating the plurality of first users as a function of credentials.

13. The method of claim 11, wherein the plurality of first user parameters comprises an element storage datum.

14. The method of claim 11, wherein identifying the at least a second user parameter comprises:
  identifying a geofence as a function of the second user data; and
  determining a location datum of the at least a second user parameter as a function of the geofence.

15. The method of claim 11, wherein transmitting the notification comprises transmitting the notification to a first user device and a second user device.

16. The method of claim 11, wherein transmitting the notification comprises:
  receiving a first user input for the notification, wherein the first user input comprises a status change of the plurality of first user parameters; and
  transmitting a second notification to the at least a second user as a function of the first user input.

17. The method of claim 16, wherein receiving the first user input comprises receiving the first user input through one or more input event handlers, wherein the first user input corresponds to a visual element of a graphical user interface.

18. The method of claim 16, wherein updating the plurality of data fields comprises updating the plurality of data fields as a function of the first user input, wherein the first user input comprises a first rejection input.

19. The method of claim 11, wherein transmitting the notification comprises generating a first user interface displaying the notification on a first user device, wherein the first user interface comprises a graphical user interface.

20. The method of claim 11, wherein transmitting the notification comprises:
  receiving a second user input for the notification, wherein the second user input comprises a second rejection input; and
  updating the plurality of data fields as a function of the second rejection input.

* * * * *